US011866850B2

United States Patent
Lin et al.

(10) Patent No.: US 11,866,850 B2
(45) Date of Patent: Jan. 9, 2024

(54) METHOD FOR PREPARING PURE CHITOSAN FIBER

(71) Applicant: Wenzhou Jiayuan Biotechnology Co. LTD, Wenzhou (CN)

(72) Inventors: Liang Lin, Wenzhou (CN); Rui Han, Wenzhou (CN); Peng Guo, Wenzhou (CN); Xinxu Yan, Wenzhou (CN)

(73) Assignee: Wenzhou Jiayuan Biotechnology Co. LTD, Wenzhou (CN)

( * ) Notice: Subject to any disclaimer, the term of this patent is extended or adjusted under 35 U.S.C. 154(b) by 0 days.

(21) Appl. No.: 18/453,478

(22) Filed: Aug. 22, 2023

(65) Prior Publication Data

US 2023/0392294 A1    Dec. 7, 2023

(30) Foreign Application Priority Data

Nov. 3, 2022    (CN) .......................... 202211365455.4

(51) Int. Cl.
*B01F 27/091*    (2022.01)
*B01F 27/1131*    (2022.01)
(Continued)

(52) U.S. Cl.
CPC ............. *D01D 1/02* (2013.01); *B01F 31/401* (2022.01); *B01F 35/123* (2022.01);
(Continued)

(58) Field of Classification Search
CPC .. B01F 27/091; B01F 27/1131; B01F 31/401; B01F 33/70; B01F 35/123; B01F 35/323;
(Continued)

(56) References Cited

U.S. PATENT DOCUMENTS 4,833,238 A * 5/1989 De Lucca ................. D01F 9/00
  264/186 X
5,842,785 A * 12/1998 Brown .................. B01F 35/323
  366/243 X (Continued)

OTHER PUBLICATIONS

CNIPA, Notification of First Office Action for Chinese application CN202211365455.4, dated Apr. 12, 2023.

(Continued)

*Primary Examiner* — Leo B Tentoni
(74) *Attorney, Agent, or Firm* — Zhigang Ma (57) ABSTRACT

The present disclosure discloses a method for preparing a pure chitosan fiber, and relates to the technical field of preparation of chitosan. The method includes the following steps: S1, preparing an acetic acid solution; S2, preparing a chitosan stock solution; S3, treating a chitosan spinning solution; and S4, preparing a chitosan fiber. In step S3, a pretreatment machine includes a body; an driving mechanism is arranged in the body; a stirring mechanism is arranged in the driving mechanism; a scraping mechanism is arranged below the driving mechanism; a preliminary treatment mechanism is arranged at an inner upper side of the body; the driving mechanism penetrates through the preliminary treatment mechanism and is arranged in the body; a separation mechanism is arranged on a bottom of the body.

4 Claims, 8 Drawing Sheets

(51) Int. Cl.
| | |
|---|---|
| *B01F 33/70* | (2022.01) |
| *D01D 5/06* | (2006.01) |
| *D01F 9/00* | (2006.01) |
| *D01D 1/02* | (2006.01) |
| *D01F 4/00* | (2006.01) |
| *D01F 1/02* | (2006.01) |
| *D01D 1/10* | (2006.01) |
| *D01D 1/06* | (2006.01) |
| *D02J 1/22* | (2006.01) |
| *D01D 10/06* | (2006.01) |
| *B01F 31/40* | (2022.01) |
| *B01F 35/12* | (2022.01) |
| *B01F 35/32* | (2022.01) |
| *B29B 7/42* | (2006.01) |
| *C08L 5/08* | (2006.01) |
| *C08B 37/08* | (2006.01) |

(52) U.S. Cl.
CPC ............ *B01F 35/323* (2022.01); *B29B 7/421* (2013.01); *D01D 1/065* (2013.01); *D01D 1/103* (2013.01); *D01D 1/106* (2013.01); *D01D 10/06* (2013.01); *D01F 1/02* (2013.01); *D01F 4/00* (2013.01); *D02J 1/22* (2013.01); *C08B 37/003* (2013.01); *D10B 2211/01* (2013.01); *D10B 2331/14* (2013.01)

(58) Field of Classification Search
CPC ......... B29B 7/421; C08B 37/003; C08L 5/08; D01D 1/02; D01D 1/106; D01D 5/06; D01D 10/06; D01F 9/00; D10B 2211/01
USPC .... 264/169, 178 F, 178 R, 186, 203, 211.14, 264/211.15; 366/78, 82, 243, 245, 309, 366/312, 328.2; 536/20
See application file for complete search history.

(56) References Cited

U.S. PATENT DOCUMENTS

| | | |
|---|---|---|
| 2010/0305489 A1 | 12/2010 | Liu et al. |
| 2013/0122601 A1 | 5/2013 | Zhou et al. |
| 2019/0144618 A1 | 5/2019 | Serrero et al. |

OTHER PUBLICATIONS

CNIPA, Notification to grant patent right for Chinese application CN202211365455.4, dated Jul. 1, 2023.

* cited by examiner

METHOD FOR PREPARING PURE CHITOSAN FIBER

TECHNICAL FIELD

The present disclosure relates to the technical field of preparation of pure chitosan fibers, and particularly relates to a method for preparing a pure chitosan fiber.

BACKGROUND

Chitosan fiber refers to a fiber made from chitosan extracted from shrimp and crab shells. Compared with a traditional terrestrial natural fiber and a synthetic fiber, the chitosan fiber has many special advantages. One of the advantages is that the chitosan fiber neither relies on petroleum, nor competes with food for lands, which opens up a third raw material source of chemical fibers. Another advantage is that wastes are used, so that it is in line with the green and environmentally-friendly sustainable development. Further, a pure chitosan fiber has broad-spectrum antibacterial property, mold resistance, excellent biocompatibility, and no immunogenicity, and also has the functions of adsorption, chelation, hemostasis, healing promotion, and scar reduction. Based on its functional role, the pure chitosan fiber can be widely used in fields of aerospace, medical treatment and public health, military and civilian textiles, filtration, protection, and the like, has huge market potential, and also plays a positive role in promoting human health.

At present, the most commonly used method for spinning a chitosan fiber is wet spinning. Main processes include: dissolving chitosan in a suitable solvent to prepare a spinning solution with a certain concentration; after filtration and debubbling, pressurizing the spinning solution to be sprayed into a coagulation bath in the form of tiny flow from small holes of a spinning jet; in the coagulation bath, coagulating the spinning solution into a solid fiber; and performing stretching, post-treatment, and drying to obtain a chitosan fiber. A process of wet spinning is generally divided into two categories:

A. chitosan→dissolution→spinning solution+filtration and debubbling→metering→spinning→preliminary bathing→stretching→secondary bathing for shaping-→post-treatment→drying→obtaining of a fiber;

B. chitosan→filtration of dissolved spinning solution-→debubbling→metering→spinning→coagulation-→stretching→shaping→post-treatment→drying→fiber.

However, there are still some problems in the above production and preparation method. In order to meet the requirements, for each step of the above method, it is required to arrange a corresponding device to treat chitosan. Multiple devices make the entire production line larger. Furthermore, due to the multiple devices, multiple workers are required to perform operations. At the same time, it is complex in operation during use of the multiple devices.

SUMMARY

For the technical problem in the prior art that the solution is monotonous, the present disclosure provides a solution that is significantly different from the prior art. An embodiment of the present disclosure provides a method for preparing a pure chitosan fiber, so as to solve the technical problem that a plurality of devices need to be arranged during the above chitosan preparation to handle with preceding steps of chitosan.

The present disclosure adopts the following technical solution: A method for preparing a pure chitosan fiber includes the following steps:

S1, preparing an acetic acid solution, wherein the acetic acid solution is prepared from water and acetic acid, with an acetic acid mass ratio of 1 w %-5 w %;

S2, preparing a chitosan stock solution: adding a chitosan raw material into the acetic acid solution obtained in step S1, standing for 30 min to preliminarily dissolve the chitosan raw material in the acetic acid solution, and then placing a chitosan spinning solution after preliminary dissolution in a pretreatment machine;

S3, treating the chitosan spinning solution: starting the pretreatment machine to run for 30 min, fully mixing the chitosan raw material with the acetic acid solution under the action of the pretreatment machine to obtain a mixture, and then performing separation, debubbling, and filtration, wherein under the action of the pretreatment machine, residue separation and debubbling treatment can be performed on the mixture of the chitosan raw material and the acetic acid solution, thereby obtaining the chitosan spinning solution;

S4, preparing a chitosan fiber: transporting the chitosan spinning solution obtained in step S3 to a spinning nozzle using a metering pump, immersing the chitosan spinning solution sprayed from the spinning nozzle in a coagulation bath for double diffusion, and solidifying the spinning solution to generate a nascent fiber, wherein coagulation liquid adopts an NaOH aqueous solution; removing a residual solution from the nascent fiber by stretching the nascent fiber; removing chemical reagents with deionized water from the stretched nascent fiber; and performing shearing and drying to obtain the chitosan fiber.

Further, the pretreatment machine in step S3 includes a body; a driving mechanism is arranged in the body; a stirring mechanism is arranged in the driving mechanism; a scraping mechanism is arranged below the stirring mechanism; a preliminary treatment mechanism is arranged at an inner upper side of the body; the driving mechanism penetrates through the preliminary treatment mechanism and is arranged in the body; a separation mechanism is arranged on a bottom of the body; the body includes an outer drum; an inner drum is arranged in the outer drum; separation holes are symmetrically arranged in the inner drum; a guide slot is formed in the inner drum; a baffle plate is arranged outside the separation holes; a gap is arranged between the inner drum and the outer drum; the baffle plate is located between the inner drum and the outer drum; the inner drum is movably connected to the baffle plate; a base plate is arranged on a bottom of the inner drum and a bottom of the outer drum; the baffle plate is fixedly connected to the base plate; and the inner drum and the outer drum are coaxial.

Further, the driving mechanism includes a driving motor; the driving motor is located on a top of the outer drum; an output end of the driving motor is provided with a threaded rod; and the threaded rod is coaxial with the inner drum.

Further, the preliminary treatment mechanism includes an extrusion block; the extrusion block is arranged in the inner drum, and the extrusion block is movably connected to the inner drum; a first electric telescopic rod is arranged on an inner side of the extrusion block; a matching block is arranged at an end portion of the first electric telescopic rod; a second guide plate is arranged below the matching block; a first guide plate is arranged below the second guide plate at least two layers of filter plates are arranged between the first guide plate and the second guide plate; each layer of filter plate is spliced into a ring by several filter plates; a supporting block is arranged on an inner side of each filter plate; the supporting block is rotatably connected to the first guide plate; the filter plates are rotatably connected to the first guide plate; and the filter plates are in contact with the second guide plate.

Further, the stirring mechanism includes a stirring rod; at least one filter hole is formed in the stirring rod; the stirring rod is designed in an arc shape, and an end portion of the stirring rod abuts against an inner wall of the inner drum; a connecting sleeve is arranged in the stirring rod; the connecting sleeve is in threaded connection with a threaded rod; a second telescopic rod is arranged at an end portion of the stirring rod; a guide ball is arranged at an end portion of the second telescopic rod; and a connecting rod is arranged outside the second telescopic rod.

Further, the separation mechanism includes a third electric telescopic rod; the third electric telescopic rod is located at a bottom end of the threaded rod; an output end of the third electric telescopic rod is provided with a clamping block; a butting block is arranged below the clamping block; a connecting disk is fixedly arranged below the butting block; the connecting disk is located above the base plate and is fixedly connected to the inner drum; a guide block is arranged between the connecting disk and the base plate, and a slag discharge port is arranged in the connecting disk; and a liquid discharge port is arranged between the inner drum and the outer drum.

Further, the scraping mechanism includes a scraping box and a collection component; the scraping box is located below the stirring rod; the scraping box is of a hollow design; an inclined plate is arranged in the scraping box; a rotating cover plate is arranged at a bottom end of the inclined plate; the rotating cover plate is located below the scraping box; a rotating block is arranged between the rotating cover plate and the scraping box, and a sealing plate is arranged on one side of the scraping box; the sealing plate is connected to the connecting rod; the collection component includes a connecting plate; the connecting plate is arranged at a lower end of the butting block; a bottom plate is arranged at the other end of the connecting plate; the bottom plate is of a bevel design; a collection box is arranged outside the bottom plate; a flip cover plate is arranged at a top of the collection box; and a top column is arranged in the collection box.

Further, the coagulation bath adopts an aqueous solution of alkali, with an alkali concentration of 3 wt % to 10 wt %.

Compared with the prior art, the present disclosure has the beneficial effects below:

Firstly, during use, the preliminary treatment mechanism can be used to preliminarily separate the mixed chitosan spinning solution and preliminarily treat the bubbles inside. At the same time, no additional power source is required for separation and bubble removal, reducing power loss. During the use, the chitosan spinning solution is poured onto the second guide plate, and at this time, the chitosan spinning solution will naturally fall under the action of the second guide plate. In the falling process, stretching will be carried out to eliminate some bubbles in the liquid. At the same time, the filter plates are arranged between the first guide plate and the second guide plate, and the solution will flow through the filter plates. When the liquid passes through the filter plates, preliminary filtration can be performed on the solution, and the effect of eliminating the bubbles can also be achieved during the filtration. Moreover, the preliminary bubble elimination and filtration are performed by the fact that the solution moves completely under the automatic liquidity and gravity, without the additional power source, which can reduce the waste of resources.

Secondly, under the action of the driving mechanism, the stirring mechanism, and the scraping mechanism, the solution inside the inner drum can be mixed and stirred, and at the same time, separated residues can be removed. When in use, the solution treated by the preliminary treatment mechanism enters the inner drum. At this time, the driving mechanism is started to run. In the running process, the stirring mechanism can rotate and also move up and down. This can better uniformly mix the solution, while the stirring mechanism can work in multiple directions through just one driving mechanism in the mixing process, which improves the practicality of the device. In addition, in the mixing and stirring process, the internal bubbles of the solution can be eliminated twice under the action of the stirring rod, which improves the functionality of the stirring rod. At the same time, the scraping mechanism is arranged below the stirring mechanism. At this time, the scraping mechanism will move synchronously with the stirring mechanism, without the need for an additional power source for the scraping mechanism, so that the energy consumption of the device is reduced.

Thirdly, under the actions of the driving mechanism and separation mechanism, the device can perform sieving debubbling on the liquid. When in use, after the liquid has been mixed and stirred, there are still some bubbles in the liquid, and the mixed liquid contains impurities. At this time, the separation mechanism connects the driving mechanism with the inner drum, and the driving mechanism enables the inner drum to rotate. The rotation of the inner drum can centrifuge the liquid. In the centrifugation process, the bubbles in the liquid can be fully removed, and the inner drum contains the separation holes, which can separate the liquid from the impurities, so that the separation mechanism has both a debubbling function and a filtration and separation function.

In summary, the device has the functions of stirring, mixing, filtration, separation, and debubbling, so that it is not necessary to arrange an additional device for each step, which reduces the production costs. Moreover, since only one device can achieve multiple effects, there is no need to transport the chitosan spinning solution, which effectively shortens the production time. At the same time, only one driving mechanism is used for overall driving, which effectively reduces power loss. This indirectly achieves the effects of energy conservation and environmental protection. Furthermore, the device can be recycled during use without affecting the normal production of the chitosan spinning solution.

BRIEF DESCRIPTION OF THE DRAWINGS

To describe the specific implementation modes of the present disclosure or the technical solutions in the prior art more clearly, drawings required to be used in the specific implementation modes or the illustration of the prior art will be briefly introduced below. Apparently, the drawings in the illustration below are some implementation modes of the present disclosure. Those ordinarily skilled in the art can also obtain other drawings according to these drawings without doing creative work.

REFERENCE NUMERALS IN THE DRAWINGS

1: body; 11: outer drum; 12: inner drum; 13: baffle plate; 14: separation hole; 15: guide slot; 2: driving mechanism; 21: threaded rod; 22: driving motor; 3: preliminary treatment mechanism; 31: extrusion block; 32: matching block; 33: filter plate; 34: first guide plate; 35: supporting block; 36: second guide plate; 37: first electric telescopic rod; 4: scraping mechanism; 41: inclined plate; 42: scraping box; 43: rotating block; 44: rotating cover plate; 45: connecting plate; 46: top column; 47: flip cover plate; 48: base plate; 49: sealing plate; 410: collection box; 5: stirring mechanism; 51: filter hole; 52: stirring rod; 53: connecting sleeve; 54: second electric telescopic rod; 55: guide ball; 56: connecting rod; 6: separation mechanism; 61: guide block; 62: butting block; 63: liquid discharge port; 64: slag discharge port; 65: clamping block; and 66: third electric telescopic rod.

DETAILED DESCRIPTION OF THE EMBODIMENTS

The technical solutions of the present disclosure will be clearly and completely described below in conjunction with the accompanying drawings. Apparently, the described embodiments are only a part of the embodiments of the present disclosure, rather than all the embodiments.

The components of the embodiments of the present disclosure generally described and shown in the drawings here can be arranged and designed in a variety of different configurations. Therefore, the following detailed description for the embodiments of the present disclosure provided in the accompanying drawings is not intended to limit the scope of the claimed present disclosure, but merely represents selected embodiments of the present disclosure.

All other embodiments obtained by those of ordinary skill in the art based on the embodiments in the present disclosure without creative work shall fall within the protection scope of the present disclosure.

In the description of the present invention, it should be noted that orientations or positional relationships indicated by the terms "center", "upper", "lower", "left", "right", "vertical", "horizontal", "inside", "outside", and the like are orientations or positional relationships as shown in the drawings, and are only for the purpose of facilitating and simplifying the description of the present invention instead of indicating or implying that devices or elements indicated must have particular orientations, and be constructed and operated in the particular orientations, so that these terms are not construed as limiting the present invention. In addition, the terms "first", "second" and "third" are only for the purpose of description, and may not be understood as indicating or implying the relative importance.

In the description of the present invention, it should be also noted that unless otherwise explicitly defined and defined, the terms "mounted", "coupled" and "connected" shall be understood broadly, and may be, for example, fixedly connected, or detachably connected, or integrally connected, or mechanically connected, or electrically connected, or directly connected, or indirectly connected through an intermediate medium, or interconnection between two elements. Those of ordinary skill in the art can understand the specific meanings of the above terms in the present disclosure according to specific situations.

As shown in FIG. 1 to FIG. 8 below, the embodiments of the present disclosure provide a method for preparing a pure chitosan fiber. The method includes the following steps:

S1, preparing an acetic acid solution, wherein the acetic acid solution is prepared from water and acetic acid, with an acetic acid mass ratio of 1 w %-5 w %;

S2, preparing a chitosan stock solution: adding a chitosan raw material into the acetic acid solution obtained in step S1, standing for 30 min to preliminarily dissolve the chitosan raw material in the acetic acid solution, and then placing a chitosan spinning solution after preliminary dissolution in a pretreatment machine;

S3, treating the chitosan spinning solution: starting the pretreatment machine to run for 30 min, fully mixing the chitosan raw material with the acetic acid solution under the action of the pretreatment machine to obtain a mixture, and then performing separation, debubbling, and filtration, wherein under the action of the pretreatment machine, residue separation and debubbling treatment can be performed on the mixture of the chitosan raw material and the acetic acid solution, thereby obtaining the chitosan spinning solution;

S4, preparing a chitosan fiber: transporting the chitosan spinning solution obtained in step S3 to a spinning nozzle using a metering pump, immersing the spinning solution sprayed from the spinning nozzle in a coagulation bath for double diffusion, and solidifying the spinning solution to generate a nascent fiber, wherein coagulation liquid adopts an NaOH aqueous solution; removing a residual solution from the nascent fiber by stretching the nascent fiber; removing chemical reagents with deionized water from the stretched nascent fiber; and performing shearing and drying to obtain the chitosan fiber.

During operation, the device has the functions of stirring, mixing, filtration, separation, and debubbling, so that it is not necessary to arrange an additional device for each step, which reduces the production costs. Moreover, since only one device can achieve multiple effects, there is no need to transport the chitosan spinning solution, which effectively shortens the production time. At the same time, only one driving mechanism 2 is used for overall driving, which effectively reduces power loss. This indirectly achieves the effects of energy conservation and environmental protection. Furthermore, the device can be recycled during use without affecting the normal production of the chitosan spinning solution.

Figure 1:
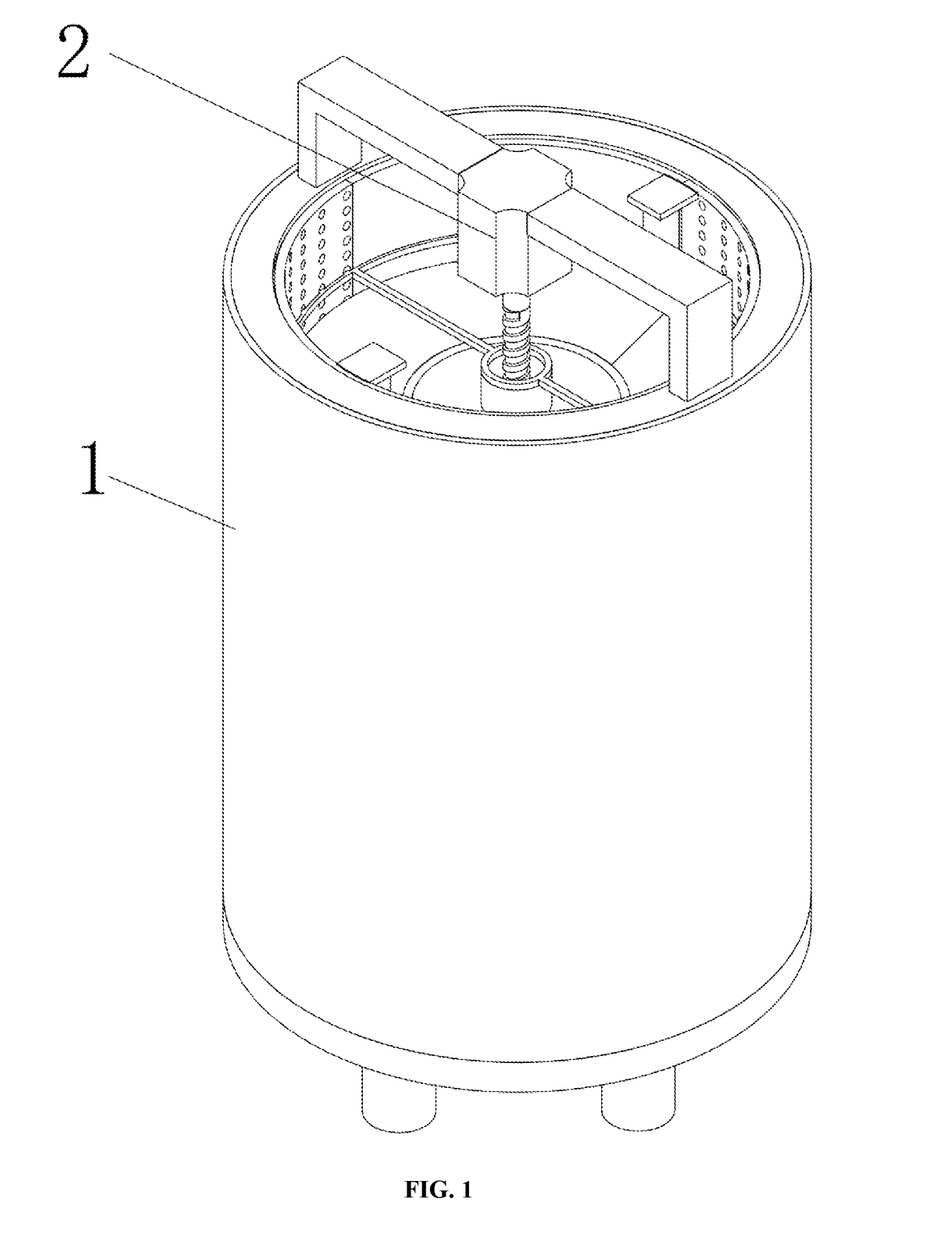
FIG. 1 is a schematic diagram of a main body structure of the present disclosure.
Figure 2:
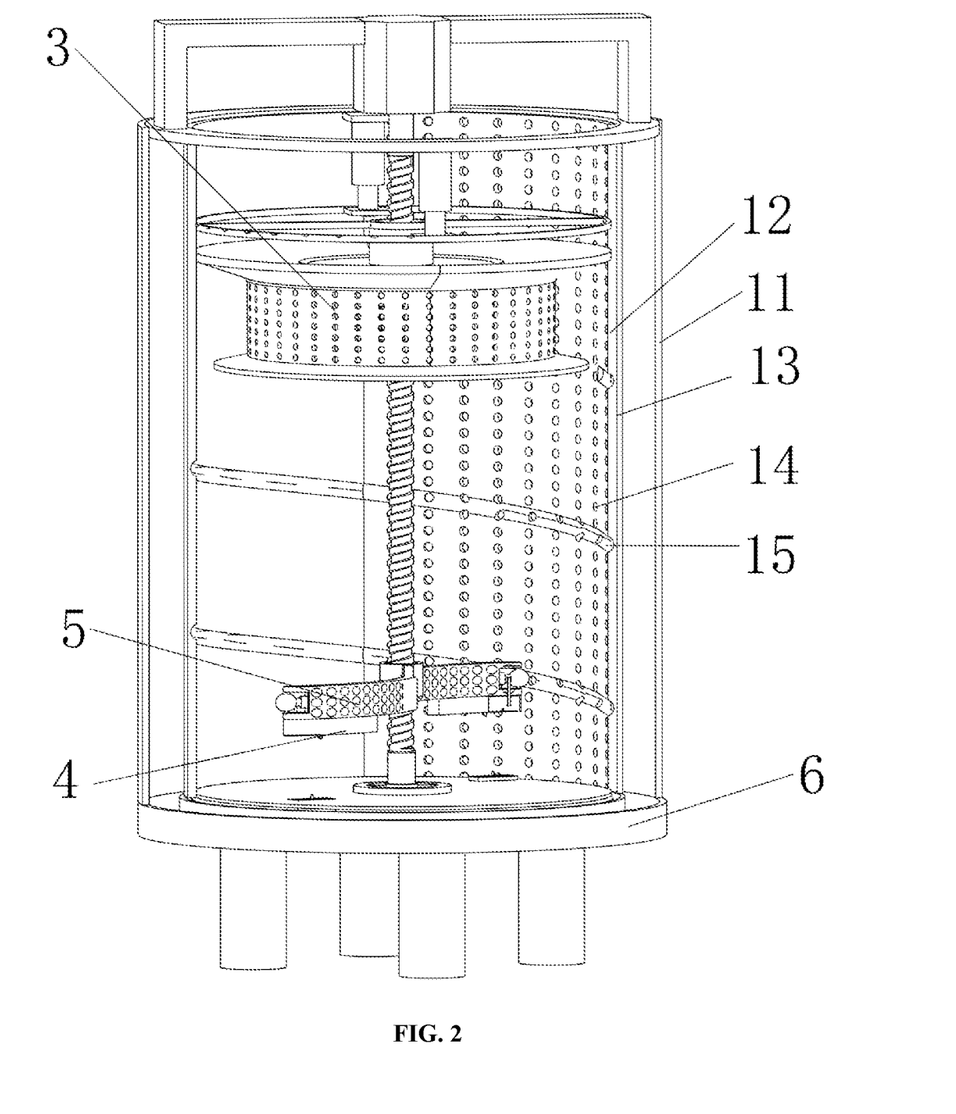
FIG. 2 is a schematic diagram of an internal structure of the present disclosure.

Specifically, the pretreatment machine in step S3 includes a body 1; a driving mechanism 2 is arranged in the body 1; a stirring mechanism 5 is arranged in the driving mechanism 2; a scraping mechanism 4 is arranged below the stirring mechanism 5; a preliminary treatment mechanism 3 is arranged at an inner upper side of the body 1; the driving mechanism 2 penetrates through the preliminary treatment mechanism 3 and is arranged in the body 1; a separation mechanism 6 is arranged on a bottom of the body 1; the body 1 includes an outer drum 11; an inner drum 12 is arranged in the outer drum 11; separation holes 14 are symmetrically arranged in the inner drum 12; a guide slot 15 is formed in the inner drum 12; a baffle plate 13 is arranged outside the separation holes 14; a gap is arranged between the inner drum 12 and the outer drum 11; the baffle plate 13 is located between the inner drum 12 and the outer drum 11; the inner drum 12 is movably connected to the baffle plate 13; a base plate is arranged on a bottom of the inner drum 12 and a bottom of the outer drum 11; the baffle plate 13 is fixedly connected to the base plate; and the inner drum 12 and the outer drum 11 are coaxially arranged.

During operation, the device has the functions of stirring, mixing, filtration, separation, and debubbling, so that it is not necessary to arrange an additional device for each step, which reduces the production costs. Moreover, since only one device can achieve multiple effects, there is no need to transport the chitosan spinning solution, which effectively shortens the production time. At the same time, only one driving mechanism 2 is used for overall driving, which effectively reduces power loss. This indirectly achieves the effects of energy conservation and environmental protection. Furthermore, the device can be recycled during use without affecting the normal production of the chitosan spinning solution. The rotation of the inner drum 12 will not affect the outer drum 11, so that the inner drum 12 can achieve a separation effect. Furthermore, the baffle plate 13 can prevent the solution from flowing out of the separation holes 14.

Specifically, the driving mechanism 2 includes a driving motor 22; the driving motor 22 is located on a top of the outer drum 11; an output end of the driving motor 22 is provided with a threaded rod 21; and the threaded rod 21 and the inner drum 12 are coaxially arranged.

During operation, the driving mechanism 2 can drive the device to perform mixing, stirring, scraping, and separation at the same time, so that the scraping mechanism 4 does not require an additional power source.

Figure 3:
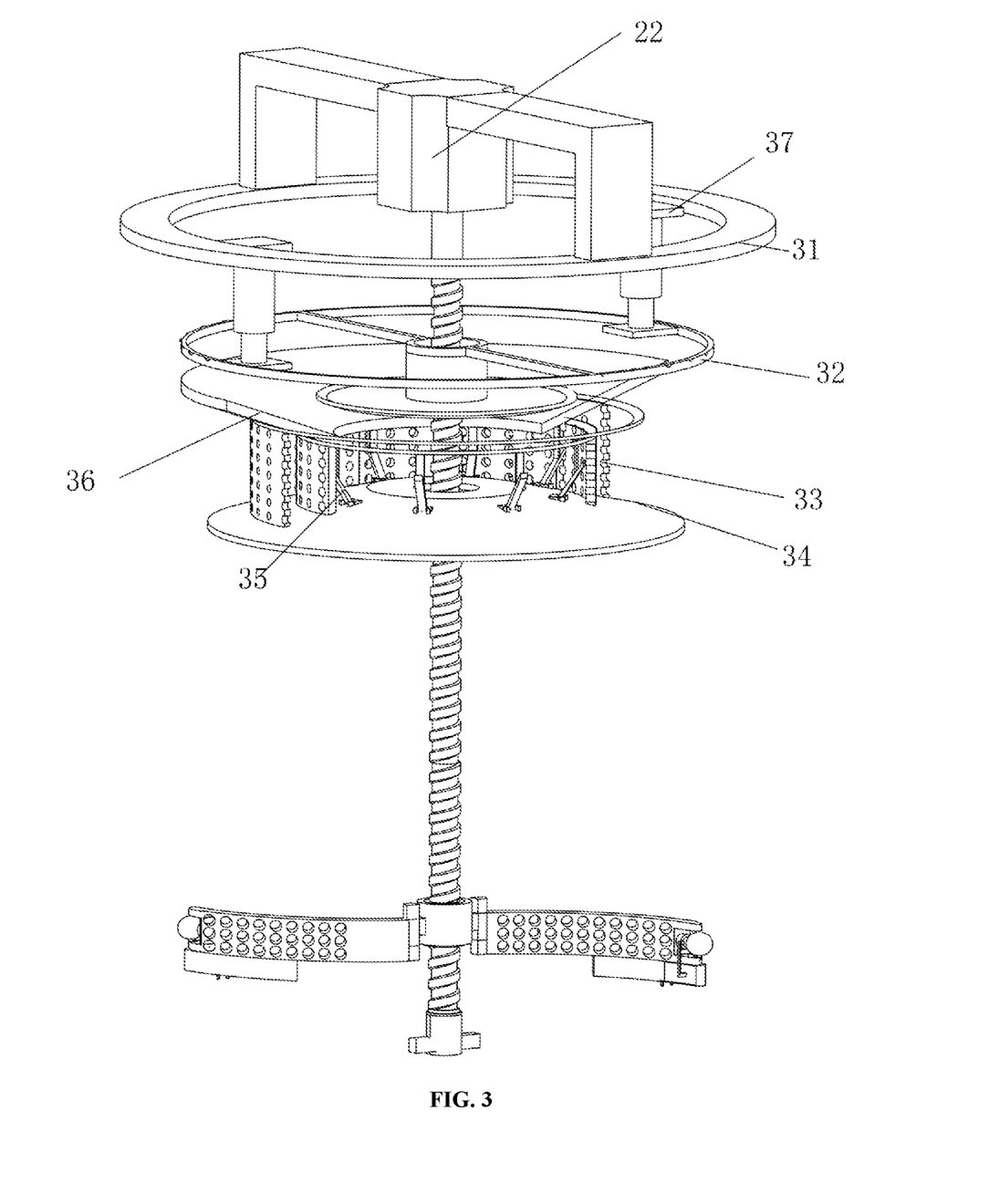
FIG. 3 is a schematic structural diagram of a preliminary treatment mechanism of the present disclosure.

Specifically, the preliminary treatment mechanism 3 includes an extrusion block 31; the extrusion block 31 is arranged in the inner drum 12, and the extrusion block 31 is movably connected to the inner drum 12; a first electric telescopic rod 37 is arranged on an inner side of the extrusion block 31; a matching block 32 is arranged at an end portion of the first electric rod; a second guide plate 36 is arranged below the matching block; a first guide plate 34 is arranged below the second guide plate 36; at least two layers of filter plates 33 are arranged between the first guide plate 34 and the second guide plate 36; each layer of filter plate 33 is spliced into a ring by several filter plates 33; a supporting block 35 is arranged on an inner side of each filter plate 33; the supporting block 35 is rotatably connected to the first guide plate 34; the filter plates 33 are rotatably connected to the first guide plate 34; and the filter plates 33 are in contact with the second guide plate 36.

During operation, the mixed chitosan spinning solution can be preliminarily separated, and bubbles inside can be preliminarily treated. At the same time, no additional power source is required for separation and bubble removal, reducing power loss. During the use, the chitosan spinning solution is poured onto the second guide plate 36, and at this time, the chitosan spinning solution will naturally fall under the action of the second guide plate 36. In the falling process, stretching will be carried out to eliminate some bubbles in the liquid. At the same time, the filter plates 33 are arranged between the first guide plate 34 and the second guide plate 36, and the liquid will flow through the filter plates 33. When the liquid passes through the filter plates 33, preliminary filtration can be performed on the liquid, and the effect of eliminating the bubbles can also be achieved during the filtration. Moreover, the preliminary bubble elimination and filtration are performed by the fact that the liquid moves completely under the automatic liquidity and gravity, without the additional power source, which can reduce the waste of resources. In addition, in the separation process of the equipment, the impurities filtered by the filter plates 33 can be eliminated, which is convenient for next filtration.

Figure 7:
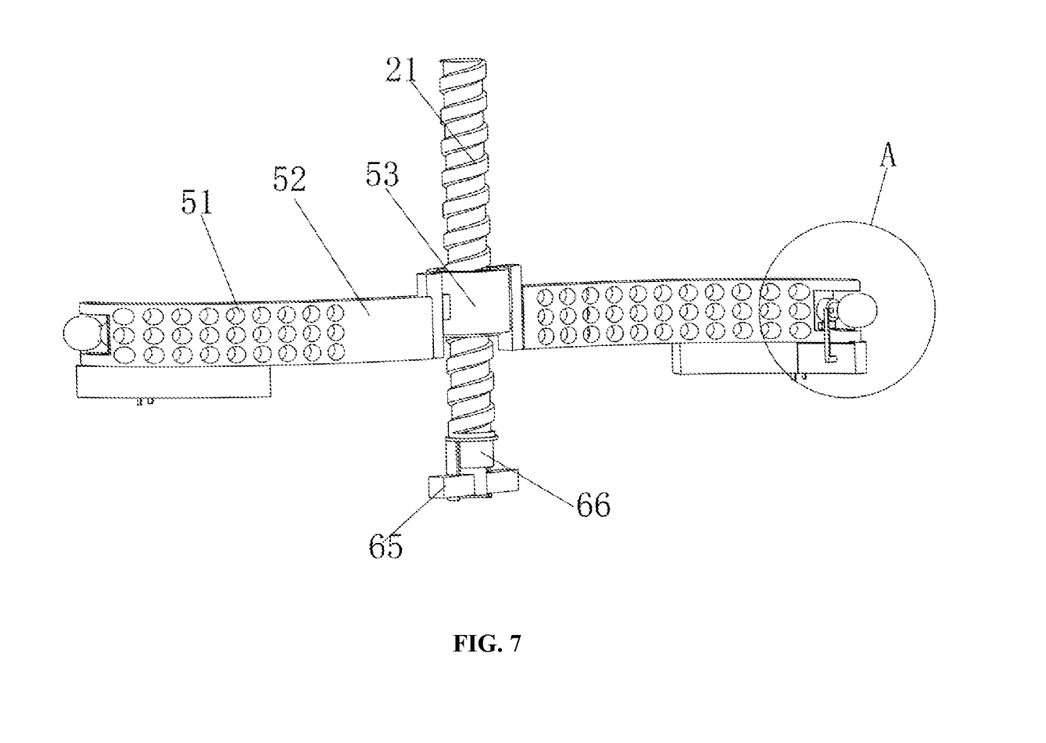
FIG. 7 is a schematic structural diagram of a stirring mechanism of the present disclosure.
Figure 8:
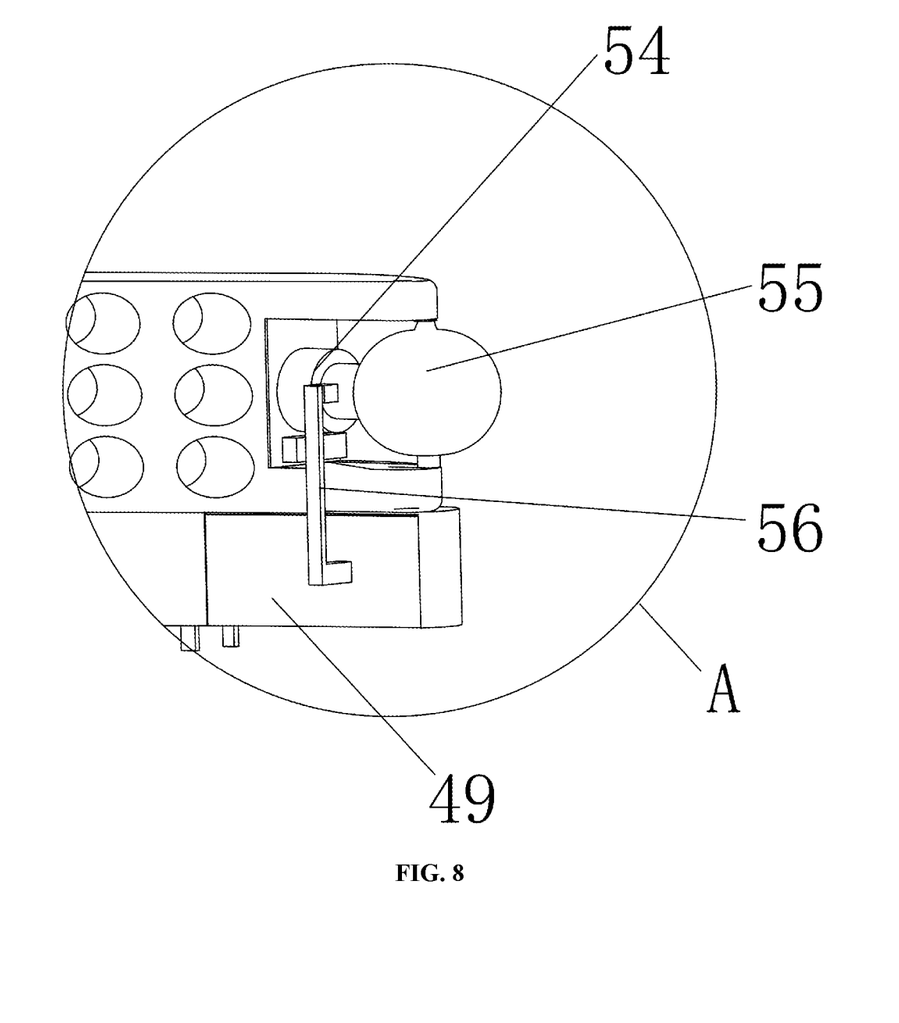
FIG. 8 is a schematic diagram of an enlarged structure of the portion A of the present disclosure in FIG. 7.

Specifically, the stirring mechanism 5 includes a stirring rod 52; at least one filter hole 51 is formed in the stirring rod 52; the stirring rod 52 is designed in an arc shape, and an end portion of the stirring rod 52 abuts against an inner wall of the inner drum 12; a connecting sleeve 53 is arranged in the stirring rod 52; the connecting sleeve 53 is in threaded connection with a threaded rod 21; a second telescopic rod is arranged at an end portion of the stirring rod 52; a guide ball 55 is arranged at an end portion of the second telescopic rod; and a connecting rod 56 is arranged outside the second telescopic rod.

Figure 4:
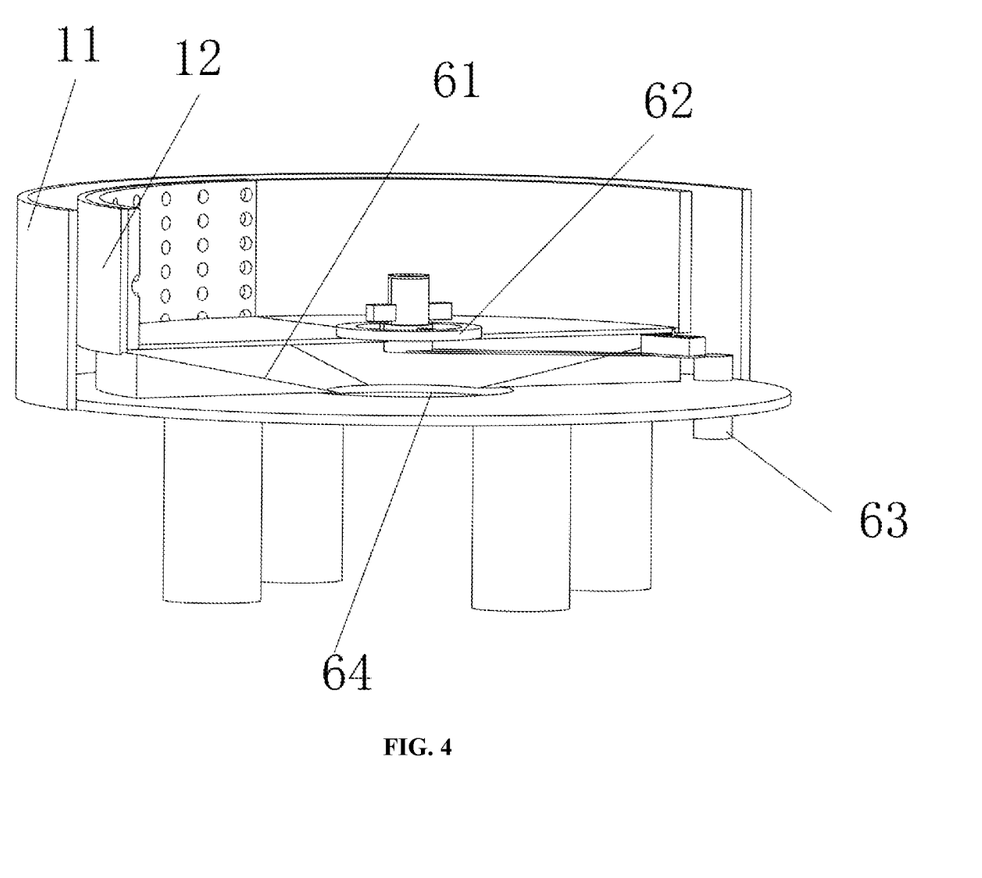
FIG. 4 is a schematic structural diagram of a separation mechanism of the present disclosure.

Specifically, the separation mechanism 6 includes a third electric telescopic rod 66; the third electric telescopic rod 66 is located at a bottom end of the threaded rod 21; an output end of the third electric telescopic rod 66 is provided with a clamping block 65; a butting block 62 is arranged below the clamping block 65; a connecting disk is fixedly arranged below the butting block 62; the connecting disk is located above a bottom plate and is fixedly connected to the inner drum 12; a guide block 61 is arranged between the connecting disk and the bottom plate, and a slag discharge port 64 is arranged in the connecting disk; and a liquid discharge port 63 is arranged between the inner drum 12 and the outer drum 11.

During operation, under the actions of the driving mechanism 2 and separation mechanism 6, the device can perform sieving debubbling on the liquid. When in use, after the liquid has been mixed and stirred, there are still some bubbles in the liquid, and the mixed liquid contains impurities. At this time, the separation mechanism 6 connects the driving mechanism 2 with the inner drum 12, and the driving mechanism 2 enables the inner drum 12 to rotate. The rotation of the inner drum 12 can centrifuge the liquid. In the centrifugation process, the bubbles in the liquid can be fully removed, and the inner drum 12 contains the separation holes 14, which can separate the liquid from the impurities, so that the separation mechanism has both a debubbling function and a filtration and separation function.

Figure 5:
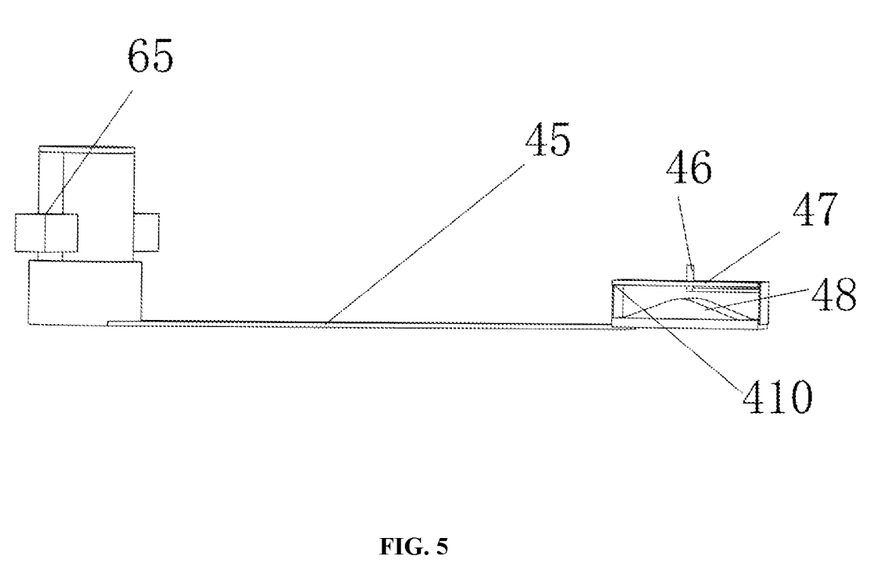
FIG. 5 is a schematic structural diagram of a collection component of the present disclosure.
Figure 6:
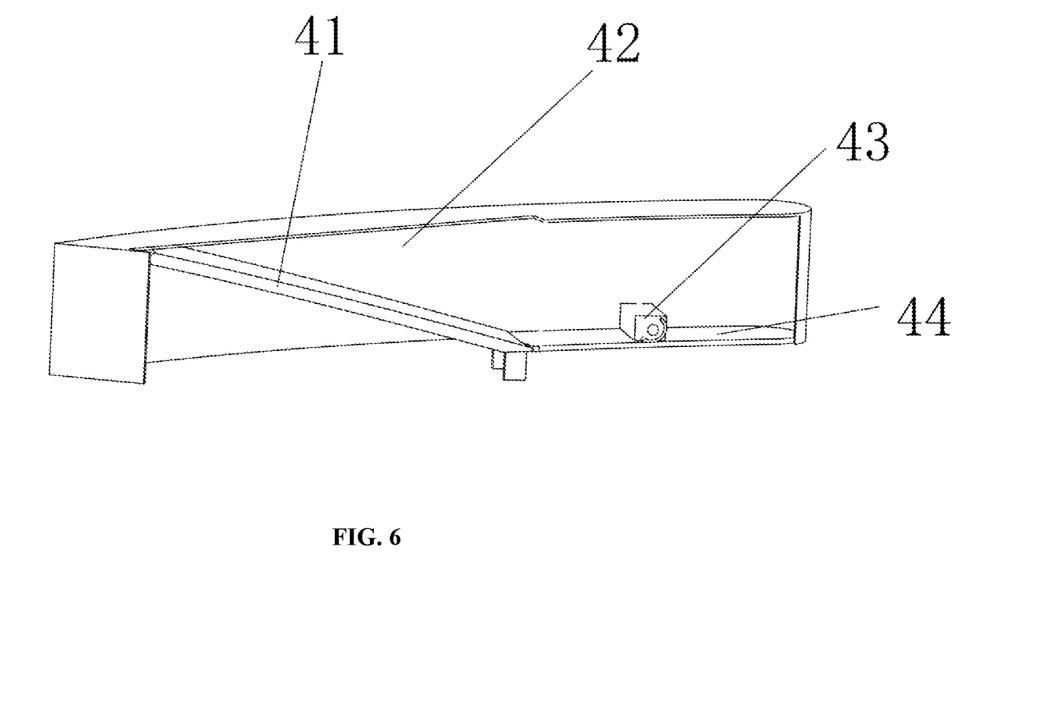
FIG. 6 is a schematic diagram of an internal structure of a scraping box of the present disclosure.

Specifically, the scraping mechanism 4 includes a scraping box 42 and a collection component; the scraping box 42 is located below the stirring rod 52; the scraping box 42 is of a hollow design; an inclined plate 41 is arranged in the scraping box 42; a rotating cover plate 44 is arranged at a bottom end of the inclined plate 41; the rotating cover plate 44 is located below the scraping box 42; a rotating block 43 is arranged between the rotating cover plate 44 and the scraping box 42, and a sealing plate 49 is arranged on one side of the scraping box 42; the sealing plate 49 is connected to the connecting rod 56; the collection component includes a connecting plate 45; the connecting plate 45 is arranged at a lower end of the butting block 62; a base plate 48 is arranged at the other end of the connecting plate 45; the base plate 48 is of a bevel design; a collection box 410 is arranged outside the base plate 48; a flip cover plate 47 is arranged at a top of the collection box 410; and a top column 46 is arranged in the collection box 410.

During operation, the impurities left in the drum after the separation can removed under the action of the scraping mechanism 4, so that the impact of the remaining impurities on next preparation of a chitosan spinning solution.

Specifically, the coagulation bath adopts an aqueous solution of alkali, with an alkali concentration of 3 wt % to 10 wt %.

The working principle is as follows: The prepared chitosan spinning solution is put in the rum. When the chitosan spinning solution is poured into the drum, the chitosan spinning solution first contacts the second guide plate 36. At this time, the chitosan spinning solution flows along the second guide plate 36. In the flowing process of the chitosan spinning solution, a surface of the chitosan spinning solution will be stretched, which can preliminarily remove the bubbles on the surface. Afterwards, the chitosan spinning solution flows above the first guide plate 34 and continues to flow along the first guide plate 34. The chitosan spinning solution may pass through the filter plates 33 during the flowing along the first guide plate 34. At this point, under the action of the filter plates 33, the impurities in the preliminarily mixed chitosan spinning solution can be separated. At the same time, when the chitosan spinning solution passes through the filter plates 33, the bubbles in the chitosan spinning solution can also be removed for the second time. Afterwards, the chitosan spinning solution enters the inner drum 12, and the driving motor 22 is started. At this time, the driving motor 22 drives the threaded rod 21 to rotate. During the rotation of the threaded rod 21, due to the connection between the threaded rod 21 and the stirring rod 52 through the connecting sleeve 53, the threaded rod 21 rotates fast, and the stirring rod 52 will move up and down due to the impact of the rotation of the threaded rod 21. At the same time, the stirring rod 52 will rotate due to the impact of the guide slot 15, thus achieving the effect of stirring and mixing the chitosan spinning solution inside. At this time, the driving motor 22 continuously performs clockwise and counterclockwise rotation to promote the mixing of the liquid. When the chitosan spinning solution is mixed to a certain extent, it is necessary to perform filtration on the liquid and the impurities. Afterwards, the first electric telescopic rod 37 and the third electric telescopic rod 66 are controlled to work synchronously through an external control switch. At this time, the clamping block 65 arranged on the bottom of the threaded rod 21 may be plugged into the butting block 62 under the action of the third electric telescopic rod 66. The rotation of the threaded rod 21 may drive the clamping block 65 to rotate. Due to the clamping between the butting block 62 and the clamping block 65, the rotation of the clamping block 65 may drive the butting block 62 to rotate. The butting block 62 is connected to the connecting disk, and the connecting disk is connected to the inner drum 12, so that the rotation of the threaded rod 21 may drive the inner drum 12 to rotate. After the first electric telescopic rod 37 works, the matching block 32 may be driven to move downwards, and the matching block 32 which moves downwards may collide with the supporting block 35, causing the supporting block 35 to tilt. The tilting of the supporting block 35 may collide with the filter plates 33, thereby driving the filter plates 33 to tilt. After the filter plates 33 tilt, the impurities filtered out by the filter plates 33 flow into the drum, while the inner drum 12 rotates under the action of the driving motor 22. At this time, the drum is in a centrifugal state. Since the inner drum 12 may rotate, the baffle plate 13 and the separation holes 14 will be misaligned. The liquid inside will be continuously separated from the separation holes 14 under the action of the rotation of the inner drum 12. In the centrifugal separation process, the bubbles in the liquid can be effectively removed, thereby achieving the debubbling effect. After the separation is completed, the second electric telescopic rod 54 works. After the second electric telescopic rod 54 works, the second electric telescopic rod 54 may drive the guide ball 55 to move, and the guide ball 55 may move out of the guide slot 15. At the same time, due to the connection between the second electric telescopic rod 54 and the sealing plate 49 through the connecting rod 56, after the second electric telescopic rod 54 moves, the sealing plate 49 may follow the second electric telescopic rod 54 to work, opening the sealing plate 49. At this time, the driving motor 22 is still working, and the threaded rod 21 may drive the scraping box 42 to continuously move up and down. Since the scraping box 42 abuts against the inner wall of the drum, the scraping box 42 can move to scrape away the impurities that are adhered to the inner wall of the drum by separation. When the scraping box 42 moves to the bottom, the top column 46 arranged in the collection box 410 may collide with the rotating cover plate 44, opening the rotating cover plate 44. At the same time, the supporting block 35 located below the scraping box 42 may also collide with the flip cover plate 47, opening the flip cover plate 47, thereby discharging the impurities collected in the scraping box 42 to the collection box 410. Afterwards, the third electric telescopic rod 66 is driven to extend again, thereby driving the base plate 48 to be opened. At this point, the impurities in the collection box 410 are discharged through the slag discharge port 64, while the treated chitosan spinning solution is discharged from the liquid discharge port 63.

It should be finally noted that the above various embodiments are only used to describe the technical solutions of the present disclosure, and not intended to limit the present disclosure. Although the present disclosure has been described in detail with reference to the foregoing embodiments, those ordinarily skilled in the art should understand that they can still modify the technical solutions described in all the foregoing embodiments, or equivalently replace some or all of the technical features, and these modifications or replacements do not depart the essences of the corresponding technical solutions from the scope of the technical solutions of all the embodiments of the present disclosure.

What is claimed is:

1. A method for preparing a pure chitosan fiber, comprising the following steps:
   S1, preparing an acetic acid solution, wherein the acetic acid solution is prepared from water and acetic acid, with an acetic acid mass ratio of 1 w %-5 w %;
   S2, preparing a chitosan stock solution: adding a chitosan raw material into the acetic acid solution obtained in step S1 for preliminary dissolution, and then placing a chitosan spinning solution after preliminary dissolution in a pretreatment machine;
   S3, treating the chitosan spinning solution: starting the pretreatment machine, mixing the chitosan raw material with the acetic acid solution to form a mixture, and then separating, debubbling, and filtering the mixture to obtain the chitosan spinning solution; and
   S4, preparing a chitosan fiber: transporting the chitosan spinning solution obtained in step S3 to a spinning nozzle using a metering pump, immersing the chitosan spinning solution sprayed from the spinning nozzle in a coagulation bath for double diffusion, and solidifying the spinning solution to form a nascent fiber; removing a residual solution by stretching the nascent fiber; removing chemical reagents with deionized water from the stretched nascent fiber, and performing shearing and drying to obtain the chitosan fiber;

wherein the pretreatment machine in step S3 comprises a body (1); a driving mechanism (2) is arranged in the body (1); a stirring mechanism (5) is arranged in the driving mechanism (2); a scraping mechanism (4) is arranged below the stirring mechanism (5); a preliminary treatment mechanism (3) is arranged at an inner upper side of the body (1); the driving mechanism (2) penetrates through the preliminary treatment mechanism (3) and is arranged in the body (1); a separation mechanism (6) is arranged on a bottom of the body (1); the body (1) comprises an outer drum (11); an inner drum (12) is arranged in the outer drum (11); separation holes (14) are symmetrically arranged in the inner drum (12); a guide slot (15) is formed in the inner drum (12); a baffle plate (13) is arranged outside the separation holes (14); a gap is arranged between the inner drum (12) and the outer drum (11); the baffle plate (13) is located between the inner drum (12) and the outer drum (11); the inner drum (12) is movably connected to the baffle plate (13); a base plate is arranged on a bottom of the inner drum (12) and a bottom of the outer drum (11); the baffle plate (13) is fixedly connected to the base plate; the inner drum (12) and the outer drum (11) are coaxially arranged;

the driving mechanism (2) comprises a driving motor (22); the driving motor (22) is located on a top of the outer drum (11); an output end of the driving motor (22) is provided with a threaded rod (21); the threaded rod (21) and the inner drum (12) are coaxially arranged;

the preliminary treatment mechanism (3) comprises an extrusion block (31); the extrusion block (31) is arranged in the inner drum (12), and the extrusion block (31) is movably connected to the inner drum (12); a first electric telescopic rod (37) is arranged on an inner side of the extrusion block (31); a matching block (32) is arranged at an end portion of the first electric telescopic rod (37); a second guide plate (36) is arranged below the matching block (32); a first guide plate (34) is arranged below the second guide plate (36); at least two layers of filter plates (33) are arranged between the first guide plate (34) and the second guide plate (36); each layer of filter plate (33) is spliced into a ring by several filter plates (33); a supporting block (35) is arranged on an inner side of each filter plate (33); the supporting block (35) is rotatably connected to the first guide plate (34); the filter plates (33) are rotatably connected to the first guide plate (34); the filter plates (33) are in contact with the second guide plate (36);

the stirring mechanism (5) comprises a stirring rod (52); at least one filter hole (51) is formed in the stirring rod (52); the stirring rod (52) is designed in an arc shape, and an end portion of the stirring rod (52) abuts against an inner wall of the inner drum (12); a connecting sleeve (53) is arranged in the stirring rod (52); the connecting sleeve (53) is in threaded connection with a threaded rod (21); a second telescopic rod is arranged at an end portion of the stirring rod (52); a guide ball (55) is arranged at an end portion of the second telescopic rod; and a connecting rod (56) is arranged outside the second telescopic rod.

2. The method for preparing the pure chitosan fiber according to claim 1, wherein the separation mechanism (6) comprises a third electric telescopic rod (66); the third electric telescopic rod (66) is located at a bottom end of the threaded rod (21); an output end of the third electric telescopic rod (66) is provided with a clamping block (65); a butting block (62) is arranged below the clamping block (65); a connecting disk is fixedly arranged below the butting block (62); the connecting disk is located above the base plate and is fixedly connected to the inner drum (12); a guide block (61) is arranged between the connecting disk and the base plate, and a slag discharge port (64) is arranged in the connecting disk; and a liquid discharge port (63) is arranged between the inner drum (12) and the outer drum (11).

3. The method for preparing the pure chitosan fiber according to claim 1, wherein the scraping mechanism (4) comprises a scraping box (42) and a collection component; the scraping box (42) is located below the stirring rod (52); the scraping box (42) is of a hollow design; an inclined plate (41) is arranged in the scraping box (42); a rotating cover plate (44) is arranged at a bottom end of the inclined plate (41); the rotating cover plate (44) is located below the scraping box (42); a rotating block (43) is arranged between the rotating cover plate (44) and the scraping box (42), and a sealing plate (49) is arranged on one side of the scraping box (42); the sealing plate (49) is connected to the connecting rod (56); the collection component comprises a connecting plate (45); one end of the connecting plate (45) is arranged at a lower end of the butting block (62); a bottom plate (48) is arranged at the other end of the connecting plate (45); the bottom plate (48) is of a bevel design; a collection box (410) is arranged outside the bottom plate (48); a flip cover plate (47) is arranged at a top of the collection box (410); and a top column (46) is arranged in the collection box (410).

4. The method for preparing the pure chitosan fiber according to claim 1, wherein the coagulation bath adopts an aqueous solution of alkali, with an alkali concentration of 3 wt % to 10 wt %.

* * * * *